US010909375B2

(12) United States Patent
Jabara et al.

(10) Patent No.: US 10,909,375 B2
(45) Date of Patent: Feb. 2, 2021

(54) SYSTEM AND METHOD FOR OPERATION IN AN AUGMENTED REALITY DISPLAY DEVICE

(71) Applicant: Mobilitie, LLC, Newport Beach, CA (US)

(72) Inventors: Gary Bernard Jabara, Newport Beach, CA (US); Harold Lee, Pasadena, CA (US); Douglas Liang, Pasadena, CA (US); George Pu-Yi Quan, Pasadena, CA (US)

(73) Assignee: Mobilitie, LLC, Newport Beach, CA (US)

( * ) Notice: Subject to any disclaimer, the term of this patent is extended or adjusted under 35 U.S.C. 154(b) by 0 days.

(21) Appl. No.: 16/179,315

(22) Filed: Nov. 2, 2018

(65) Prior Publication Data

US 2020/0050855 A1   Feb. 13, 2020

Related U.S. Application Data

(60) Provisional application No. 62/716,273, filed on Aug. 8, 2018, provisional application No. 62/754,490, filed on Nov. 1, 2018.

(51) Int. Cl.
*G06K 9/00* (2006.01)
*G06T 19/00* (2011.01)
(Continued)

(52) U.S. Cl.
CPC .......... *G06K 9/00671* (2013.01); *G06T 7/90* (2017.01); *G06T 19/006* (2013.01);
(Continued)

(58) Field of Classification Search
CPC .............. G06T 19/006; G06T 7/70–75; G06K 9/00201–00214
See application file for complete search history.

(56) References Cited

U.S. PATENT DOCUMENTS 8,606,645 B1 * 12/2013 Applefeld ............. G06T 19/006
705/14.25
8,838,381 B1 * 9/2014 Daily .................. G01C 21/3647
345/632
(Continued)

OTHER PUBLICATIONS

International Search Report and Written Opinion dated Oct. 25, 2019, in International Patent Application No. PCT/US2019/045781, filed Aug. 8, 2019, 12 pages.

*Primary Examiner* — Ryan McCulley
(74) *Attorney, Agent, or Firm* — Davis Wright Tremaine LLP; Michael J. Donohue

(57) ABSTRACT

A mobile device captures an object image using the built in imaging capability of the device. A structural recognition module analyzes the captured image to identify the 3D shape of the captured object. A color recognition module analyzes the color of the captured image to differentiate between objects that may be similar in shape. The image analysis information is sent to a server and the server selects an appropriate video file for augmented reality (AR) display on the mobile device. User selection of an operational language for the mobile device may also provided to the server. The system includes audio data files in different languages corresponding to each video AR file. The server selects the audio file corresponding to the language selection data provided by the mobile device. The language appropriate audio file is linked to the video file and the video and audio AR data are transmitted to the mobile device.

21 Claims, 8 Drawing Sheets

(51) Int. Cl.
*G06T 7/90* (2017.01)
*H04N 21/81* (2011.01)
*H04N 21/485* (2011.01)
*H04N 21/414* (2011.01)

(52) U.S. Cl.
CPC .............. *G06T 2207/10016* (2013.01); *G06T 2207/10024* (2013.01); *G06T 2207/10028* (2013.01); *H04N 21/41407* (2013.01); *H04N 21/4856* (2013.01); *H04N 21/816* (2013.01)

(56) References Cited

U.S. PATENT DOCUMENTS

| | | | |
|---|---|---|---|
| 9,330,300 B1* | 5/2016 | Palmer, III | G06K 9/00281 |
| 9,424,461 B1* | 8/2016 | Yuan | G06K 9/00201 |
| 9,652,534 B1* | 5/2017 | Narayanan | G06F 16/951 |
| 2004/0197022 A1 | 10/2004 | Gonsalves | |
| 2009/0185723 A1 | 7/2009 | Kurtz | |
| 2010/0026809 A1 | 2/2010 | Curry | |
| 2013/0083173 A1* | 4/2013 | Geisner | G06F 3/013 |
| | | | 348/51 |
| 2013/0235193 A1* | 9/2013 | Chang | H04N 9/73 |
| | | | 348/143 |
| 2014/0111542 A1* | 4/2014 | Wan | G06F 3/147 |
| | | | 345/633 |
| 2017/0092004 A1* | 3/2017 | Nishizawa | G06T 19/006 |
| 2018/0101985 A1* | 4/2018 | Jones-McFadden | |
| | | | G06T 19/006 |
| 2018/0122129 A1 | 5/2018 | Peterson | |
| 2019/0019339 A1* | 1/2019 | Jones | G06T 11/60 |
| 2019/0147653 A1* | 5/2019 | Henderson | G06T 19/006 |
| | | | 345/633 |
| 2019/0199993 A1* | 6/2019 | Babu J D | H04N 13/122 |

* cited by examiner

SYSTEM AND METHOD FOR OPERATION IN AN AUGMENTED REALITY DISPLAY DEVICE

CROSS REFERENCE OF THE RELATED APPLICATION

This application claims the benefit of U.S. Provisional Application No. 62/754,490, filed Nov. 1, 2018, and U.S. Provisional Application No. 62/716,273, filed Aug. 8, 2018, which are both incorporated herein by reference in their entirety.

BACKGROUND OF THE INVENTION

Field of the Invention

The present disclosure is directed to an augmented reality system and, more particularly, to a system and method for color, shape, and language recognition in an augmented reality display system.

Description of the Related Art

Advances in computer technology, especially with respect to computer graphics, has led to great advances in technologies to enhance a user experience. Virtual reality (VR) is typically defined to include a computer generated experience in a completely simulated environment. The auditory and visual simulations are typically implemented in a virtual realty headset or in a multi-projector environment. In contrast to VR, augmented reality (AR) is an interactive experience that combines a real-world environment with computer generated graphical objects, auditory data and other sensory effects that combine computer generated data with the real world data.

A typical AR experience requires the computer systems to identify certain objects. However, a shortcoming of the technology is the inability to recognize certain structural shapes and colors. In addition, it is desirable to have the auditory experiences presented in the language selected by the user. It can be appreciated that there is a significant need for improvements to the technology that provides structural and color recognition and language identification. The present invention provides this, and other advantages, as will be explained in the following detailed description and accompanying figures.

BRIEF DESCRIPTION OF THE SEVERAL VIEWS OF THE DRAWING(S)

DETAILED DESCRIPTION OF THE INVENTION

There are no prior methods in differentiating between colors when it comes to marker recognition for Augmented Reality (AR) tracking. Prior approaches in differentiating and identifying markers are based on the shapes inside the marker only. Widely used APIs employ shape-based AR marker recognition only.

Furthermore these traditional APIs can only different between shapes that are drastically different. For example, conventional AR tracking of a candy package will have a hard time differentiating between the different flavor packagings. This is especially true if the main logo is large in size because the algorithm will be drawn to that promenade feature.

The system and method described herein can differentiate between AR markers that have the same shape with different color. This is achieved using shape-based recognition in conjunction with color based differentiation.

For the end user they are able to see two different interactions between two products that have identical packaging but with different colors. For example, the disclosed technology will enable users to see two different interactions on two different flavors of vitamin water where the only distinguishing feature of the different flavors may be the color of the labels. Traditional AR tracking technology will get confused with the Vitamin Water product line since they look almost identical in shape/form/layout but with different color.

Furthermore, the disclosed technology can accurately differentiate between similar packaging designs in a product line by detecting the color differences. Therefore manufacturers, such as the candy manufacturer described above, will be able to track their product line without having to drastically reprint their packages.

In addition, the disclosed technology is able to differentiate between different structural elements. For example, objects identified by the system may be cylindrical in nature. Alternatively, the objects may be box-like in shape. The objects may also be flat and appear as two-dimensional structures. The disclosed technology is able to identify the type of structure and, in one embodiment, can select a video based on the identified 3D shape.

In addition, it is desirable to have an accompanying audio track that is in a language selected by the user. As will be described in greater detail below, mobile devices permit the user to select a desired language (e.g., English, Spanish, German, and the like). The system described herein identifies the user selected language and selects and audio track in the appropriate language and links the selected audio track to the selected video file to create a multi-media file in the user selected language.

Figure 1:
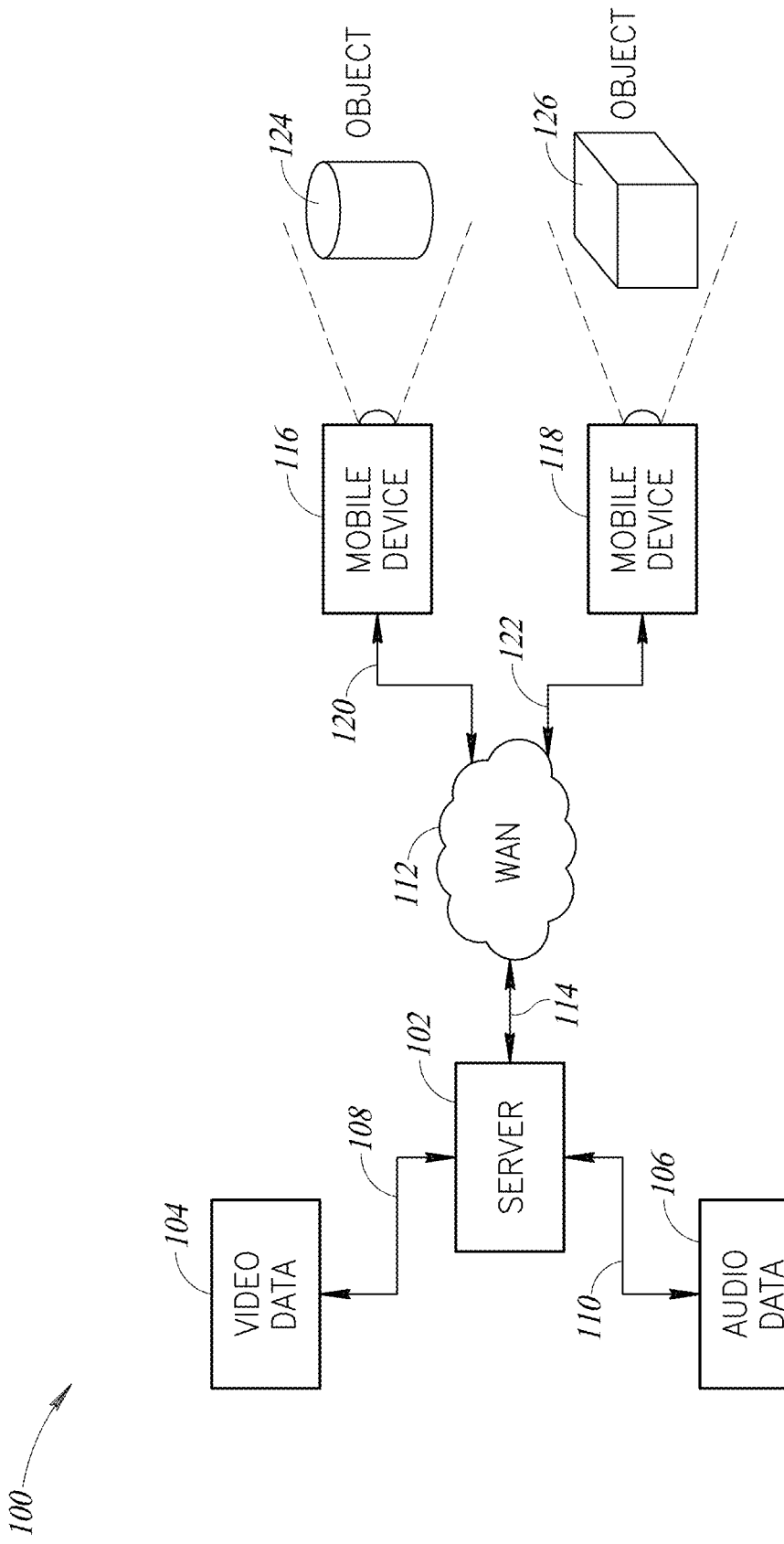
FIG. 1 illustrates a sample system architecture used to implement the teachings of the present disclosure.

The present invention is illustrated, in one embodiment, as a system 100, illustrated in FIG. 1. FIG. 1 illustrates a server 102 that is configured to receive image recognition data from a mobile device and to select video and audio data to form an AR file for delivery to the mobile device. The server 102 has access to video data 104 in the form of a plurality of video AR files. Similarly, the server 102 has access to audio data 106 in the form of audio data files that may be of a plurality of different languages. Typically a video file in the video data 104 will have a number of corresponding audio data files of different languages. The video data 104 and audio data 106 may be an integral part of the server 102 or may be communicatively coupled to the server via communication links 108-110, respectively.

The server 102 is coupled to a wide area network (WAN) 112, such as the Internet, via a communication link 114. The communication link 114 may be any of a number of known communication technologies that may include wired, wireless, optical, satellite, and other known forms of communication links. The system 100 is not limited by the specific form of the communication link 114.

FIG. 1 also illustrates a mobile communication device 116 and a mobile communication device 118. The mobile communication devices 116-118 are conventional "smart phones" that have been programmed with the AR processing technology described herein. The mobile communication device 116 is coupled to the WAN 112 via a communication link 120 while the mobile communication device 118 is coupled to the WAN via a communication link 122. Although illustrated as simple communication links 120-122, those skilled in the art will appreciate that there are a number of known technologies for coupling a mobile device to the Internet. For example, the mobile communication device 116 may communicate with the WAN 112 via a cellular service provider, a wireless hotspot (typically employing WiFi communication in accordance with IEEE 802.11), or the like. Similarly, the mobile communication device 118 may implement the communication link 122 in a similar fashion. These known technologies for coupling the mobile device to the WAN 112 need not be described in greater detail herein.

As illustrated in FIG. 1, the mobile device 116 includes imaging elements, such as cameras. The camera is a common accessory included in the mobile communication devices 116-118. In operation, the mobile communication device 116 captures an image of an object 124. The AR recognition technology in the mobile communication device 116 can identify the shape and color of the object. This data is provided to the server 102 via the WAN 112 and the various communication links to permit the server 102 to select the proper video data based on the object recognition.

In addition, the mobile device sends data related to the user selection of language for the mobile device 116 and provides that information to the server as well. Using the image recognition data and language selection data, the server 102 selects the appropriate video data and accompanying audio data, with the proper language selection, and transmits it back to the mobile device 116 for AR display on the mobile device.

Similarly, the mobile device 118 captures an image of an object 126, and performs a similar image analysis. The mobile device 118 reports the image analysis data and language selection data to the server 102 via the WAN 112 and associated communication links. Based on the recognition of a different object 126, the server 102 may select different video data and different accompanying audio data, with the proper language selection, for transmission to the mobile device 118. Thus, each of the mobile devices 116-118 may identify different objects 124-126, respectively and, as a result, receive different AR video and audio data. Furthermore, each mobile device 116-118 will receive the accompanying audio data in the language selected by the user of the respective mobile devices.

Figure 2:
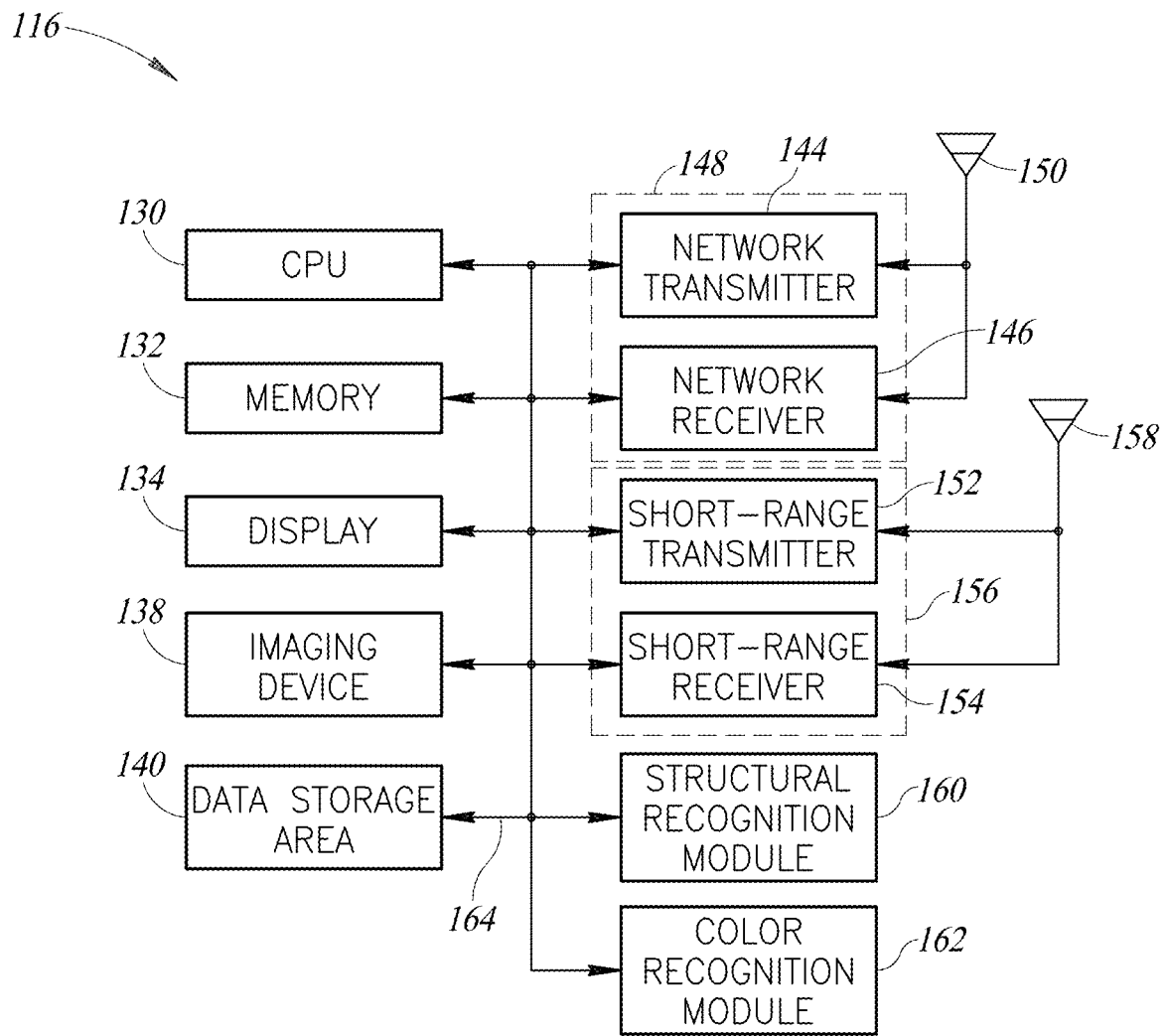
FIG. 2 is a functional block diagram of a mobile device configured for operation in accordance with the present teachings.

FIG. 2 is a functional block diagram illustrative of one of the mobile devices illustrated in FIG. 1 (e.g., the wireless communication device 116). The mobile device 116 includes a central processing unit (CPU) 130. Those skilled in the art will appreciate that the CPU 130 may be implemented as a conventional microprocessor, application specific integrated circuit (ASIC), digital signal processor (DSP), programmable gate array (PGA), or the like. The mobile device 116 is not limited by the specific form of the CPU 130.

The mobile device 116 in FIG. 2 also contains a memory 132. In general, the memory 132 stores instructions and data to control operation of the CPU 130. The memory 132 may include random access memory, ready-only memory, programmable memory, flash memory, and the like. The mobile device 116 is not limited by any specific form of hardware used to implement the memory 132. The memory 132 may also be integrally formed in whole or in part with the CPU 130.

The mobile device 116 of FIG. 2 also includes conventional components, such as a touch-screen display 134. These are conventional components that operate in a known manner and need not be described in greater detail.

The mobile device 116 of FIG. 2 also includes an imaging device 138 in the form of a camera. Modern mobile devices often include a front and back camera. As will be described below, the imaging device captures an image of the object 124 for structural and color analysis.

FIG. 2 also illustrates a data storage area 140. The data storage area 140 may contain user-selected parameters that control operation of the mobile device 116. The data storage area 140 may be implemented as any convenient data structure and may be part of the memory 132.

Other conventional components found in wireless communication devices, such as a USB interface, Bluetooth interface, infrared device, and the like, may also be included in the mobile device 116. For the sake of clarity, these conventional elements are not illustrated in the functional block diagram of FIG. 2.

The mobile device 116 of FIG. 2 also includes a network transmitter 144 such as may be used by the mobile device for the conventional wireless communication with a cellular network (not shown). FIG. 2 also illustrates a network receiver 146 that operates in conjunction with the network transmitter 144 to communicate with the cellular network. In a typical embodiment, the network transmitter 144 and network receiver 146 share circuitry and are implemented as a network transceiver 148. The network transceiver 148 is connected to an antenna 150. The network transceiver 148 is illustrated as a generic transceiver. Mobile devices (e.g., the mobile devices 116 118) may be implemented in accordance with any known wireless communication protocol including, but not limited to, CDMA, WCDMA, GSM, UMTS, 3G, 4G, 5G, WiMAX, LTE, or the like. Operation of the network transceiver 148 and the antenna 150 for communication with a cellular network is well-known in the art and need not be described in greater detail herein.

The mobile device 116 of FIG. 2 also includes a short-range transmitter 152 that is used by the mobile device 116. FIG. 2 also illustrates a short-range receiver 154 that operates in conjunction with the short-range transmitter 152. In a typical embodiment, the short-range transmitter 152 and short-range receiver 154 are implemented as a short-range transceiver 156. The short-range transceiver 156 is connected to an antenna 158. In an exemplary embodiment, the antennas 150 and 158 may have common components are implemented as a single antenna.

In an exemplary embodiment, the short-range transceiver 156 may be designed for operation in accordance with IEEE standard 802.11, sometimes referred to as WiFi. Many modern wireless communication devices are equipped with WiFi and may be readily upgraded to support the functionality described herein.

The mobile device 116 also comprises a structural recognition module 160. The structural recognition module 160 is configured to identify the structure of the object 124. For example, the structural recognition module 160 will identify 3D cylindrical objects, 3D box-like objects, and objects that are essentially flat. The operation of the structural recognition module 160 will be discussed in great detail below.

The mobile device 116 also comprises a color recognition module 162. The color recognition module 162 is configured to identify colors in the object 124. Many objects are similar or even identical except for a color difference. As discussed above, bottles of vitamin water may be virtually identical except for the color of the label. The color recognition module 162 will identify colors in the object to help differentiate between similar objects with different colors. The color recognition module 162 can identify colors in flat object and in 3D objects. The color recognition module 162 may also operate in conjunction with the structural recognition module 160 to help identify structure by change in color gradients. The operation of the color recognition module 162 will be discussed in great detail below.

The structural recognition module 160 and color recognition module 162 together generate object identification data that is sent to the server 102 (see FIG. 1) to aid in the selection of the desired AR video and AR audio to be sent back to the mobile device 116.

The various components illustrated in FIG. 2 are coupled together by a bus system 164. The bus system may include an address bus, data bus, power bus, control bus, and the like. For the sake of convenience, the various busses in FIG. 2 are illustrated as the bus system 164.

Structural Recognition

Figure 3:
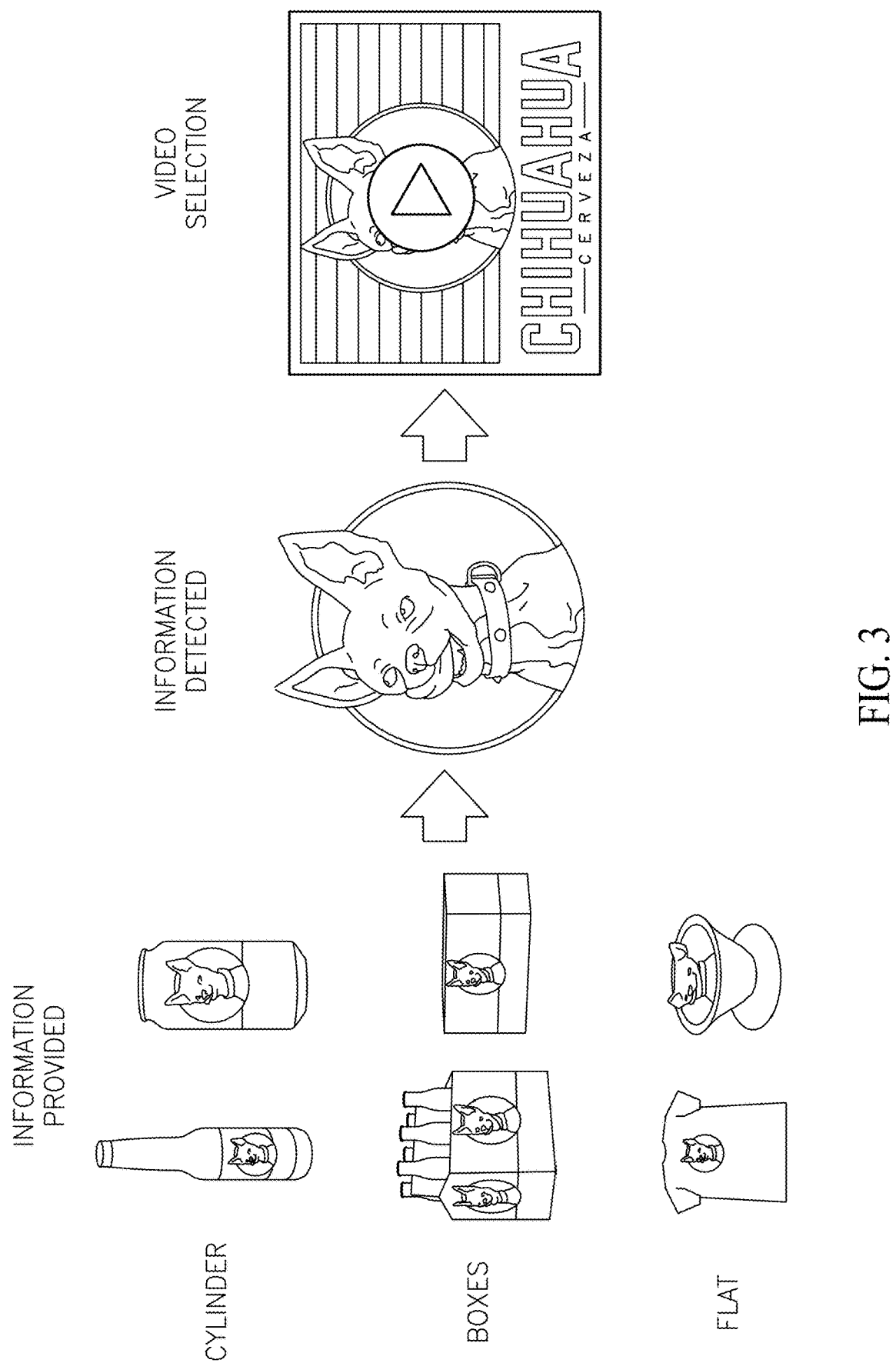
FIG. 3 is a diagram illustrating the inability of an augmented reality image identification system in the absence of structural recognition.

FIG. 3 illustrates the difficulty in identifying objects and selecting a corresponding video when structural recognition is unavailable. On the left of FIG. 3 is the information provided. In essence, the object 124 (see FIG. 1) may be in different 3D forms, such as a cylinder, a box, or a flat (or nearly flat) object. The mobile device 116 captures an image of the object using the imaging device 138 (see FIG. 2). In the absence of structural recognition, a typical AR identification routine would identify a flat two dimensional object. In the example of FIG. 3, the object is a Chihuahua.

As a result of the object identification as a flat image of the Chihuahua, a video selection is made. However, the video selection cannot be customized for presentation with the various 3D objects illustrated on the left of FIG. 3.

Figure 4:
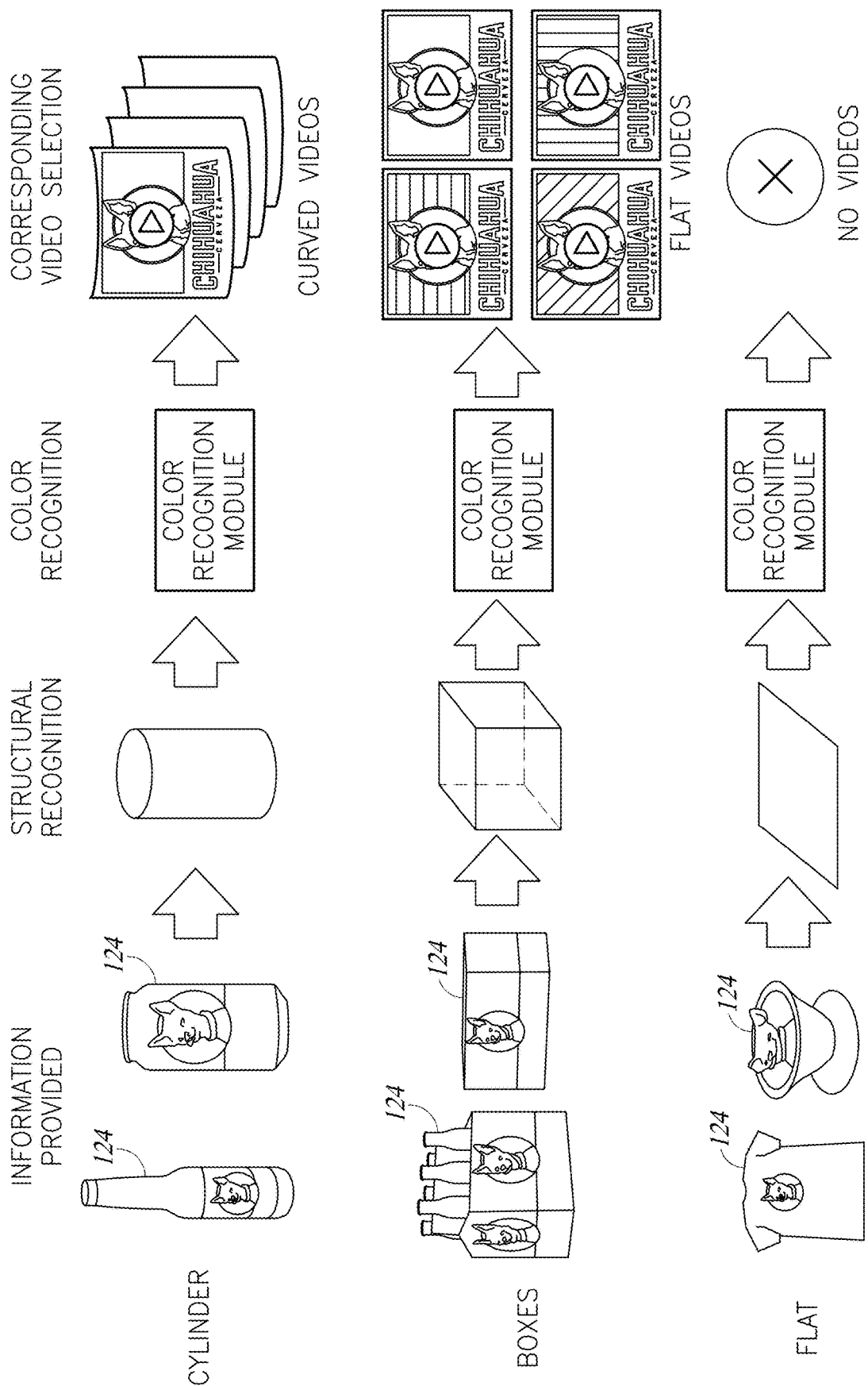
FIG. 4 illustrates the operation of the system in accordance with the present teachings to provide structural and color recognition of an object.

FIG. 4 illustrates the process where structural recognition is provided. On the left of FIG. 4, the same information regarding the object 124 (see FIG. 1) is provided in the captured object image as illustrated in FIG. 3. In the examples of FIGS. 3 and 4, those objects may be cylindrical, box-like in nature, or essentially flat. The structural recognition module 160 (see FIG. 2) analyzes the image captured by the imaging device 138 and analyzes it to determine the appropriate structural nature of the object 124. The structural recognition module 160 can provide dividing markers into three separate sections to differentiate between a bottle (or can), package, or merchandise. A grid system may be applied to understand the curvature of labels and boundaries.

In one embodiment, the structural recognition module 160 uses wrapped perceptive markers to simulate curvature and 3D structures.

In a further analysis, the structural recognition module 160 can analyze the gradient of the light in the captured image to judge the shape of the object. The color recognition module 162 can detect specific areas in the object and further detect extended areas of packaging to differentiate between objects. The light gradient analysis discussed above can also be applied by the color recognition module 162 to judge the shape of the object. As a result, the system 100 provides full recognition of the 3D shape and captures markers on all orientations of the object 124.

The structural recognition module 160 can layout a grid of dots on the object, such as a label. The color of the label is determined at the position of each dot. The brightness of colors extracted on a vertical column of dots would be expected to yield a similar brightness. On the other hand, the brightness level of colors extracted on a horizontal row of dots will produce a gradient from darker levels near the edge of the label to brighter levels in the middle and then back to darker levels as the structural recognition module 160 analyzes dots at other end of the label. With such information, the structural recognition module 160 is able to detect that there is horizontal curvature while the structure stays consistent in the vertical orientation.

It is also possible to apply contrast and level filtering to further define the edges of the object 124. The structural recognition module 160 evaluates curvature of edges to understand the differentiation between objects, such as a bottle (or can), package or merchandise. In this aspect, the structural recognition module 160 applies line filtering to read the structure of the object to better understand the curvature on the edge of the object, such as a label. Using a high contrast photo filter to isolate the border of the printed label, it is then possible to calculate the trajectory of the border edges to understand if they are curved or straight. If the edges are straight, the structural recognition module 162 can conclude that the label is printed on a box. If the edges are curved, the structural recognition module 160 can conclude that the label is printed on a bottle or cylinder. The structural recognition module can further analyze the curve trajectory to determine the diameter of the bottle or cylinder.

In a further embodiment, the structural recognition module 160 recreates a three-dimensional (3D) structure of the object (e.g., the objects 124-126) on which a label is printed into a Computer Aided Design (CAD) model. Once the model is created, the structural recognition module 160 "attaches" the label onto the CAD model. The CAD model may be rotated and images collected in all directions using the imaging device 138 (see FIG. 2). For example, the cylindrical object 124 (see FIG. 1) can be rotated in one degree increments and an image captured at each of those incremental rotational positions. In this example, a total of 360 images, corresponding to 360 degrees of rotation, would be captured that embody the object at any angle. The structural recognition module 160 can look at the captured image of an unidentified object and compare it to the 360 captured images of the CAD model to thereby precisely identify the object and its orientation.

In the example of the rectangular package object 126 in FIG. 1, the CAD model is also rotated to permit the capture of the object and its attached label. As with the example of the cylindrical object 124, the structural recognition module 160 can look at the captured image of an unidentified object 126 and compare it to the 360 captured images of the CAD model to thereby precisely identify the object and its orientation.

In a further embodiment, the structural recognition module 160 is trained to identify the difference between a planar object and a non-planar object. The structural recognition module 160 looks for planes that labels are on or planes to which the labels are adjacent. If two adjacent planes are recognized at 90° with respect to each other, the structural recognition module 160 can conclude that the object is box. On the other hand, if the structural recognition module 160 identifies only a single isolated plane, it can conclude that the object is a flat image, such as a poster or a stamp. In yet another example, if the structural recognition module 160 cannot detect a plane, but is still able to identify a label, the structural recognition module can conclude that the object is a curved label.

Figure 5:
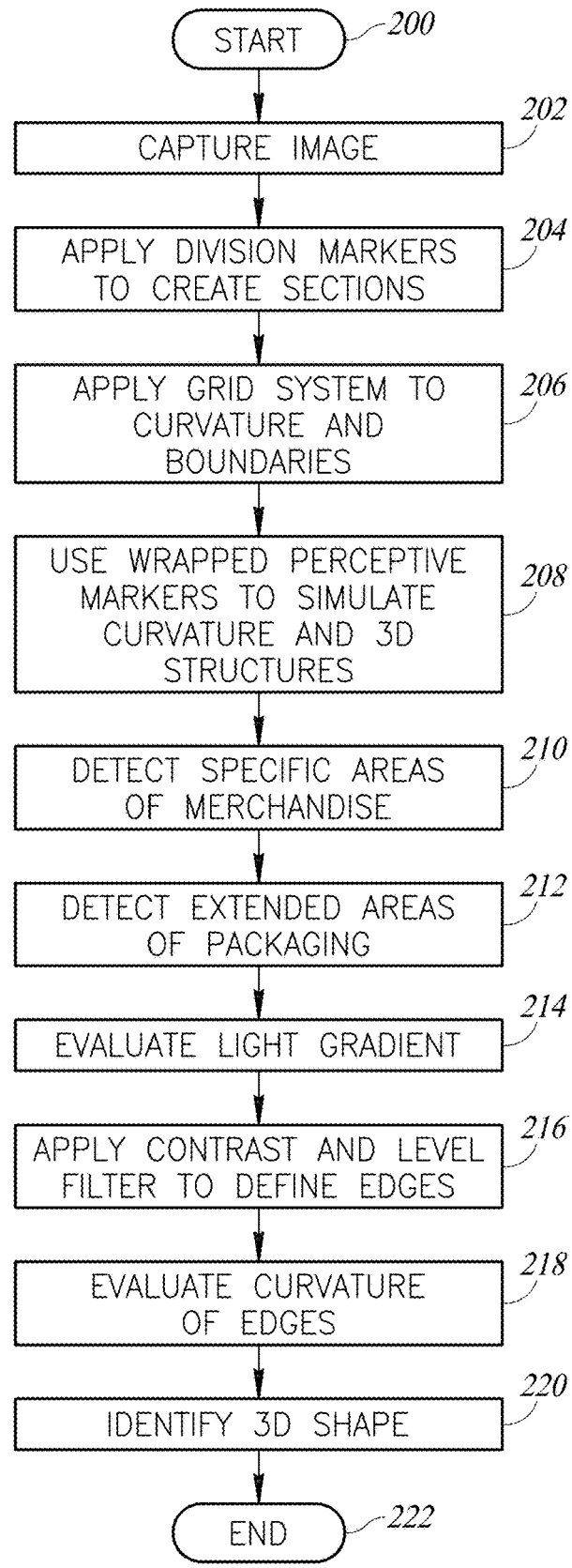
FIG. 5 is a flowchart illustrating the operation of a structural recognition module.

The operation of the structural recognition module 160 is described in the flowchart of FIG. 5 where, at a start 200, the object 124 is presented to the mobile device 116. At step 202, the mobile device 116 captures an image of the object 124 using the imaging device 138 (see FIG. 2). In step 204, the structural recognition module 160 applies division markers to create sections to differentiate the objects. In step 206, the structural recognition module 160 applies a grid system to identify curvatures and boundaries in the object 124. In step 208, the structural recognition module 160 uses wrapped perceptive markers to simulate curvature and 3D structures.

In step 210, the structural recognition module 160 detects specific areas of merchandise. In step 212, the structural recognition module 160 detects extended areas of packaging to again help differentiate the objects. In step 214, the structural recognition module 160 evaluates the light gradient to judge the shape of the object. As those skilled in the art will appreciate, a curved object will have a greater light gradient than a flat object. Furthermore, the color recognition module 162 may be employed to evaluate color gradient changes to further identify the structural nature of the object 124.

In step 216, the structural recognition module 160 applies contrast and level filters to define edges of the object 124. In step 218, the structural recognition module evaluates curvature of the edges of the object. In step 220, the structural recognition module 160 can capture the 3D image of the object to identify the 3D structure of the object (e.g., the objects 124-126 in FIG. 1). The structural recognition module 160 can also apply the planar detection features described above to help determine the 3D structure of the object. Utilizing these processes, the structural recognition module 160 identifies the 3D shape of the object in step 222. The process ends at 222.

Those skilled in the art will appreciate that not all steps of this process may be required to identify the structural nature of the object 124. Furthermore, the steps described above may performed in a different sequence. Upon completion of the structural analysis, the mobile device 116 transmits the object identification data to the server 102 in the manner described above.

Color Recognition

The system 100 accomplishes differentiation between similarly shaped augmented reality markers with different colors or differently colored areas. The color recognition module 162 (see FIG. 2) analyzes the color of the object 124 as a further means of identifying the object. The user of the mobile device 116 is able to use the color recognition module 162 to differentiate between similar markers with different colors, backgrounds, text color and any color variation between the similar markers.

The color recognition module 162 can determine information of the marker via a rendered variable, a compressed or uncompressed file or metadata from the marker. The color recognition module 162 can also be modified to limit recognition of non-matching colored markers at a certain percentage of difference between the similarly shaped markers. In other words, the color recognition module 162 will find the closest color to an expected or specified color in the event that the color does not match the marker.

The imaging device 138 (see FIG. 2) in the mobile device 116 generates a data array representing the captured image of the object 124. The array includes color information, such as color values from Red, Green, and Blue (RGB) light sensing elements in the light sensor in the imaging device 138. In addition to the RGB levels, the imaging device 138 stores Brightness level values for each pixel in the image array. The color recognition module 162 utilizes this data in its color analysis.

An AR Marker (or Marker) is typically considered to be any object that is recognized by computer vision technology. The object color may be considered as any variation and representation of color in a digital medium.

There are a number of different components to the color recognition module 162. Each is described below. Those skilled in the art will appreciate that not every color recognition component described below may need to be implemented and the components may, in some cases, be implemented in a sequence other than that described below.

Component 1—Detection

The color recognition module 162 will use computer vision analysis within a digital medium to detect the object 124 to be rendered. The color recognition module 162 identifies the color by obtaining a variable, an array of data or image to be rendered. Markers are specified areas of interest within an object, such as a label. These are essentially sample points within a boundary of the object or near the boundary of the object. The color information is obtained from the markers.

The detection can also use filters that are premade to increase the precision of the recognition like variables, equations, templates or marker specific shapes of the area of interest. The filters can be specified as a variable that represents a template to be used, an array of data specifying the affected areas or an area of interest map or image. For example, a label on a can or bottle may be considered the area of interest. In another example, the label on a flat package may be the area of interest. In these examples, an array of color data values for the area of interest can be evaluated by the color recognition module 162 to determine the best match.

The colors can be sorted using a range of Red, Green, and Blue (RGB) values from 0 to 255. The template increases the accuracy of the filter by selecting specific points on the marker that provide the most accurate color detection. The templates that specify the location of the points selected for color detection can be edited by the product owner. Alternatively, the color recognition module 162 can use one of the predetermined templates provided with the system.

In an exemplary embodiment, the marker specific shapes may refer to stored version of the marker 3D shape and image. For example, FIG. 4 illustrates a Chihuahua on a cylinder (e.g., a can). In this example, the Chihuahua dog curved onto the cylinder to the exact dimensions of the can is saved in the data storage area 140 (See FIG. 2). With this stored marker, it is possible to readily distinguish between a Chihuahua dog on a flat surface and a Chihuahua dog on a curved surface of a can and play the proper video. The color recognition module 162 can advantageously use the marker specific shape, as described above, to determine the color at different surfaces in 3D space. Even without stored markers, the color recognition module 162 can apply known machine learning techniques to become more accurate in differentiating between different colors.

The data retrieved can be based on cross dimensional data which can be retrieved two dimensionally from one two dimensional (2D) digital media, three dimensionally from two 2D digital medias or cross dimensionally from several cross dimensional digital medias. Cross Dimensional refers to any type of data from any dimension. (e.g., 2D or 3D). The cross dimensional data is used by the color recognition module 162 to more accurately determine the color.

For example, the color recognition module 162 can examine the gradient of light across the object 124 in multiple dimensions. If the cylindrical object 124 is vertically position, as illustrated in FIG. 1, the light gradient in marker samples will vary in the horizontal direction due to the curvature in the cylindrical surface. That is, the brightness of colors extracted from the marker samples will progress from darker levels near the curved edge to brighter levels in the middle of the object and back to darker levels near the other curved edge of the object. In contrast, light gradient in marker samples in the vertical direction will be constant from top to bottom of the object 124 because there is no curvature in that dimension.

The areas of interest can be represented by cross dimensional surfaces where it can be represented by filters that are two dimensional, three dimensional or cross dimensional. The color and brightness data generated by the imaging device 138 (see FIG. 2) and the filters applied to that data can also vary based on the dimensional restrictions when looking at the product which will be accounted on the system.

Component 2—Color Rendering

The color recognition module 162 will render the data by determining the likelihood of each marker to the identified marker. There are multiple ways this can be determined.

In one exemplary embodiment, the color recognition module 162 places the data within a single variable and compares it to the equivalent marker until it finds the most similar one. A "variable" as described above refers to RGB color values. A single variable refers to the color values from a single selected pixel in a particular marker.

Alternatively, the color recognition module 162 can get the data (e.g., the RGB and Brightness data from the imaging device 138) and evaluate every single one of the colors within the array for each marker. In this context, an "array" refers to multiple variables as opposed to a single variable described above. For example, the color recognition module 162 can get additional variables by laying out a grid of pixels over a label and retrieve the RGB color values for each pixel in the grid to understand the overall color of the label.

This will be done by getting the color from the data and comparing it to the desired color for each marker. Then after checking the difference between the two colors the difference will be stored in a variable. In theory, the closer the color is to the ideal color the difference will be smaller while the farther it is from the ideal color the difference will be bigger. By comparing for each one of the colors and adding the difference of each data within the same array the smallest value that was added from all of the markers must be the most similar one.

Component 3—Color Matching Technology

The color recognition module 162 may alternatively implement different versions which use hue, saturation, and value (HSV), hue, saturation, and lightness (HSL) and Red, Green, and Blue (RGB) technologies used in color signal processing. For HSV and HSL the color recognition module 162 will use the hue as a way to determine the color. The difference will be equal to how likely it is to be this marker. For RGB by using a Euclidean method to determine the distance in 3-D space the color recognition module 162 will use the distance as an added variable to determine the likelihood it is to this marker.

The likelihood can also be evaluated as a combination of RGB, HSV and HSL. By analyzing the result for RGB, HSV and HSL, the color recognition module 162 can determine with certainty how likely it is to be the indicated color.

In yet another alternative analysis technique, the color recognition module 162 evaluates the similarity by using filter based on the desired marker. Where the data will be evaluated by using a cross dimensional filter to check for the color and the result of evaluating this filter with the real data will result in the likelihood of the image being the object to be tracked. For HSV and HSL, in order to make it more precise the color recognition module 162 will evaluate hue as a redundant value and likewise it will only accept the color only if its within a certain range Component 4—Offset Calculation Technology The offset is a variable that is used to put a color within an even field with all other markers. For example, if there is a high prevalence of a specific color the color recognition module 162 can recognize that there will be a high amount of this color and decide to level it in the ranking between other markers. The use of the offset is to render the image, remove the colors other than the relevant colors and reduce the amount of them so it cannot be misidentified as a different object 124. The offset is a way of compression of the image by the amount of color. The offset however can also be the representation of a color filter that will help the system to know specifically where the affected area is and avoid colors that are irrelevant.

Component 5—Offset Rendering

The offset will be processed by identifying the imaging data associated with the area to be affected. The offset can be represented by a file that shows the area of interest or a variable that represents the compressed amount of color that is not important to the area of interest. The offset can be rendered by the color recognition module 162 to obtain data similarly to the one of the system and will create the filter or the variable necessary. The offset will represent the data that is wished to be ignored or the data from the relevant color that needs to be ignored. For example a label may be predominantly red with white characters on the background of red. Under normal conditions, it may be difficult for a color recognition system to identify the white characters. The offset rendering described herein effectively instructs the color recognition module 162 to ignore the predominant color (red in the present example) so that the white characters are more readily discerned from the background.

Component 6—Color Marker Pairing

The markers will be categorized by category and subcategory. Where the category can be defined as the shape first and then the color or vice versa. Those likewise can be defined as individual markers based on the color if necessary.

Component 7—Limiting Recognition

There will be variables within the system that can prevent some markers to be shown if they are not similar enough.

Likewise there can be variables that can help to increase and decrease precision to account for brightness, and other factors. If the label cannot be identified by the color recognition module 162, it may be possible to prevent any video from being displayed on the mobile device 116.

Component 8—White Balance

Figure 8:
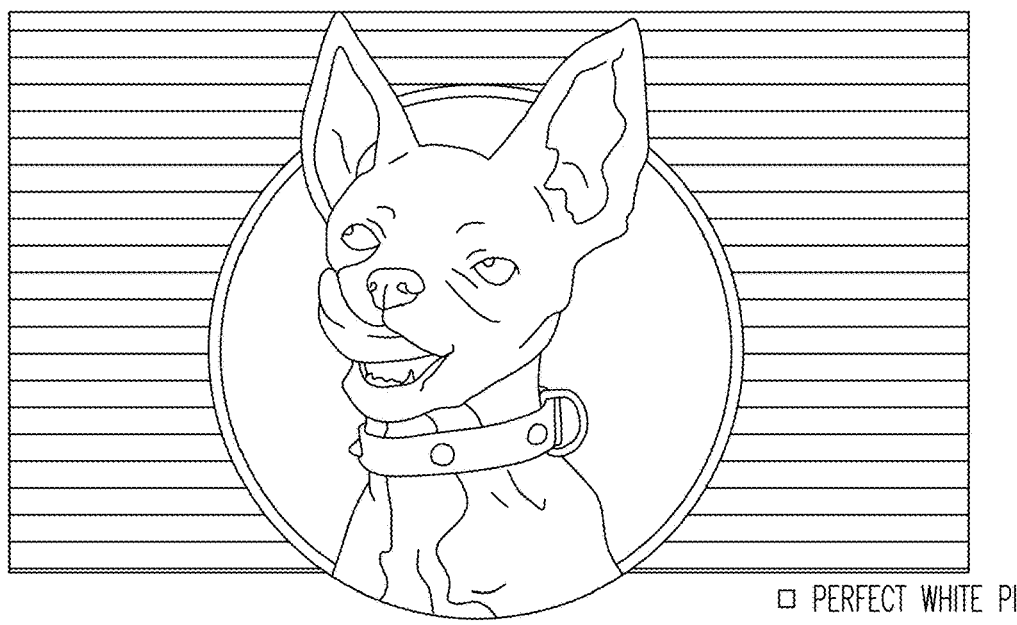
FIG. 8 illustrates the selection of a perfect or ideal white pixel in a label to assist with color correction.

This feature allows more accurate color detection in different light sources. For example, during sunset the lighting becomes very yellow. When a blue label is put under this light the app reads the output becomes a yellow with a slight blue. This results in a failed output of yellow label instead of the desired blue outcome. The solution is to select a portion of the label that is perfect white. By understanding the color of what white has become we can readjust the image to output a true color. The example of FIG. 8 illustrates a label with a Chihuahua dog on the label and a white pixel just below the image of the Chihuahua.

In another example, photographers use an 18% reflectance gray card in color photography to provide white color balance in the exposure. The use of a gray card in color photography is well known. In a similar fashion, the label can include a small color correction segment or region on the label that is the perfect white pixel described above or a gray card.

Component 9—RGB Cube

Figure 9:
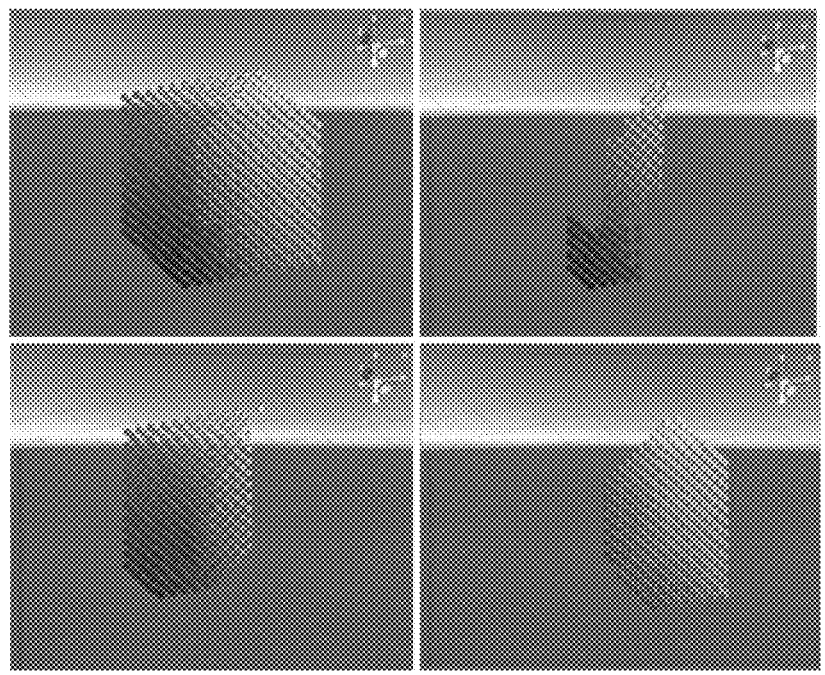
FIG. 9 illustrates a color cube used as a troubleshooting tool to visually identify color identification in a captured image.

It can be useful to determine the color makeup of an object captured by the imaging device 138 (see FIG. 2). By creating a RGB cube in 3D space we are able to pinpoint the exact output of a color. FIG. 9 illustrates such a color cube that may be conveniently used as a troubleshooting tool to visually understand what the color recognition module 162 is doing in the color identification. The RGB cube reflects the output color by putting Red on the X axis, Blue on the Z axis and Green on the Y axis. When a color is detected through the imaging device 138 (see FIG. 1) it is sent through the color recognition module 162 and reflected on the RGB cube as the actual color that is being detected. At present, the RGB cube is used troubleshooting operations, but is not used in the actual operation of the color recognition module 162.

Conclusion

Thus, the color recognition module 162 can use one or all the following components: Detection, Color Rendering, Color Matching Technology, Offset Calculation Technology, Offset Rendering, Color Marker Pairing, Limiting Recognition White Balance, and the RGB Cube. Therefore, any combination of any of this components can be implemented by the color recognition module 162.

The system 100 will be able to use the color recognition module 162 to differentiate between different markers of similar shape but different color. The color recognition module 162 can also determine the difference between any sector of color by using filtering systems and limiting the settings.

Figure 6:
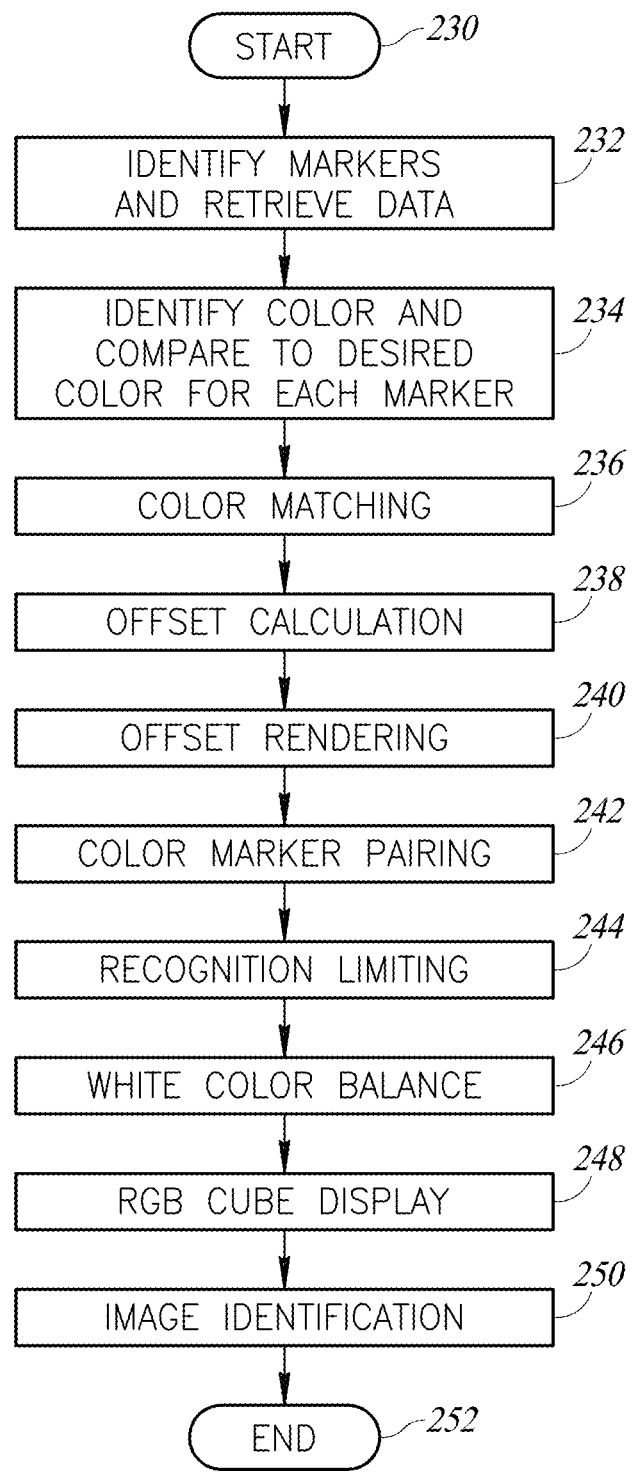
FIG. 6 is a flowchart illustrating the operation of a color recognition module.

The operation of the color recognition module 162 is described in the flowchart of FIG. 6 where, at a start 230, the imaging device 138 (see FIG. 2) in the mobile device 116 has captured an image of the object 124. In step 232, the color recognition module 162 identifies markers and retrieves the relevant data related to the identified markers. In step 236, the color recognition module 162 performs a color matching analysis to determine the color of the identified markers.

In step 238, the color recognition module 162 determines an offset calculation, if necessary to adjust color levels to reduce the effect of a high prevalence color. In step 240, the color recognition module 162 applies the color offset and adjusts colors that are not important to the particular area of interest.

In step 242, the color recognition module 162 is configured to pair the colors and markers. As noted above, this process may be performed by on both shape and color. In step 244, the color recognition module 162 limits (i.e., eliminates) markers if they are not similar enough to the expected values.

In step 246, the color recognition module 162 is configured to perform a white balance process to adjust for ambient lighting conditions that may otherwise lead to color interpretation errors. As noted above, the white balance process may use a white pixel known in the object (e.g., the object 124 in FIG. 1). A similar white balance process can be performed with a white color correction segment or a gray card color correction segment on the label.

For troubleshooting purposes, in step 248 the color data from the imaging device 138 (see FIG. 2) can be sent to the RGB cube for display in the manner illustrated in FIG. 9. This may be useful, for example, with adjusting the white color balance using the white pixel or the white/gray color correction segment on the label. Finally, in step 250, the object is identified on the basis of the color recognition and the process ends at 252.

Language Identification

The system 100 also permits the selection of audio files in different languages. In this aspect, a particular video AR file may have a plurality of corresponding audio files, but in different languages. As noted above, the user of the mobile device selects a language for operation of the mobile device as part of the initial set-up of the device itself. That data is stored in the data storage area 140 (see FIG. 2).

The mobile device 116 sends language selection data to the server 102 (see FIG. 1). This data may be included in the transmission of object identification data or may be a separate communication. The server identifies the desired video AR file based on the object identification data. As noted above, the server can access a plurality of audio AR files that correspond to the identified video AR file. The server 102 can then use the language selection data to select one of the corresponding audio AR files in the language corresponding to the language selection data from the mobile device 116.

Figure 7:
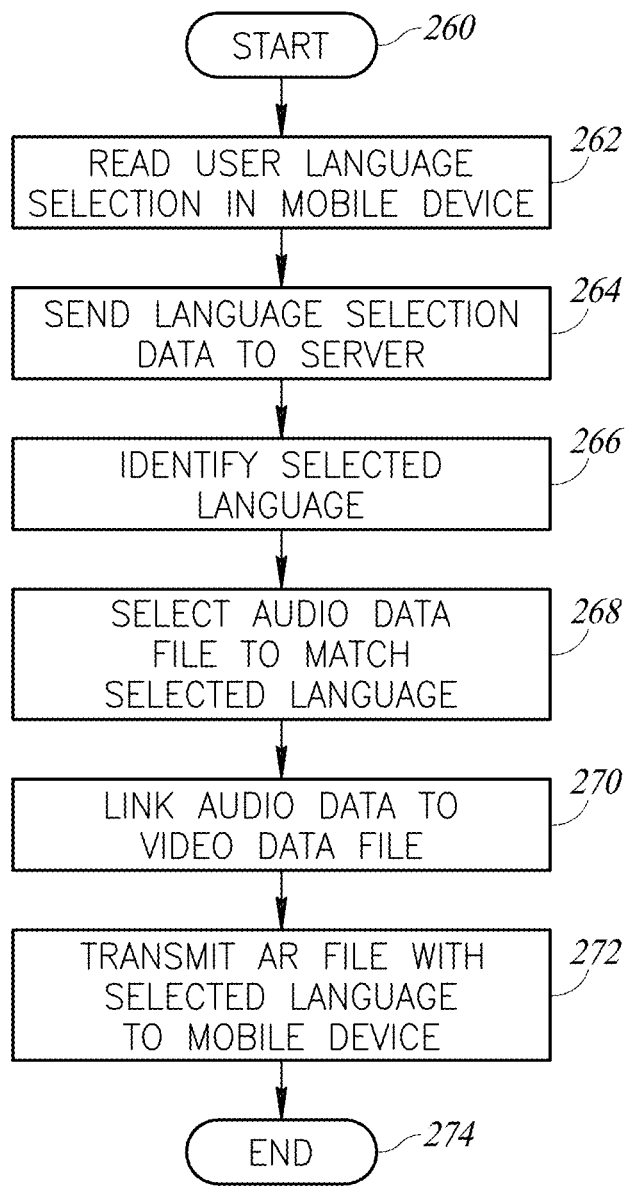
FIG. 7 is a flowchart illustrating the operation of language identification parameters selected by the user of the mobile device.

The language identification and audio AR file selection is outlined in the flowchart of FIG. 7. At a start 260, the mobile device 116 has been configured by the user and any user selected parameters, including language selection, are maintained in the data storage area 140 (see FIG. 2). In step 262, the system 100 in the mobile device 116 reads the user language selection for the mobile device. In step 264, the mobile device sends the language selection data to the server 102 via the communication links described above.

The server 102 (see FIG. 1) uses the received information to identify the selected language in step 266. The server 102 may optionally store the language selection parameter in association with the particular mobile device (e.g., the mobile device 116 of FIG. 1). In step 268, the server 102 selects the audio data file corresponding to the selected video file and matching the selected language. In step 270, the server 102 links the audio file, with the appropriate language selection to the video data file. In step 272, the server 102 transmits the AR file with the appropriate selected video file and the corresponding audio file with the user-selected language to the mobile device 116 for display and playing of the corresponding audio file in the user-selected language. The process ends at 274.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for the control of augmented reality (AR) in a mobile communication device, comprising:
    an imaging device configured to capture an image containing at least one unidentified object;
    storing the captured image in a memory as a two-dimensional data array;
    detecting the unidentified object to be identified within the stored image;
    defining edges of the unidentified object in the captured image;
    evaluating any curvature of the edges of the unidentified object in the captured image;
    evaluating a color gradient of the unidentified object in multiple dimensions;
    using the evaluation of the defined edges and the evaluated color gradient to determine whether the unidentified object has a planar or non-planar structural shape;
    designating specified regions of the unidentified object;
    retrieving color data associated with the specified regions of the unidentified object;
    performing a color matching analysis to determine the color of the specified regions of the unidentified object;
    identifying a color of the unidentified object;
    based on the identified structural shape and identified color of the unidentified object, identifying the unidentified object in the captured image;
    transmitting object identification data, containing structural shape information and color information for the identified object, to a server;
    the server using the object identification data to select an augmented reality (AR) video file from a plurality of AR video files stored in the server;
    transmitting the selected AR video file to the mobile communication device; and
    the mobile communication device playing the received AR video file on a display of the mobile communication device.

2. The method of claim 1, further comprising:
    the mobile communication device transmitting a language selection parameter based on user language selection for operation of the mobile communication device;
    the server using the received language selection parameter to select an augmented reality (AR) audio file from a plurality of AR audio files stored in the server, the selected AR audio file corresponding to the selected AR video file and being in the language corresponding to the language selection parameter;
    transmitting the selected AR audio file to the mobile communication device; and
    the mobile communication device playing the received AR audio on an audio output device of the mobile communication device in conjunction with the received AR video file being played on the display of the mobile communication device.

3. The method of claim 1 wherein identifying the structural shape of the unidentified object further comprises:
    segmenting the captured image to create sections and thereby differentiate between objects within the captured image;
    applying a grid to thereby identify curvatures and boundaries within the captured image; and
    evaluating a light gradient to thereby identify any curvatures of objects in the captured image, wherein determining whether the unidentified object has a planar or non-planar structural shape uses the identified curvatures of objects in the captured image.

4. The method of claim 1 wherein identifying the structural shape of the unidentified object further comprises identifying the unidentified object as a three dimensional (3D) cylindrical object based on the color gradient in the captured image.

5. The method of claim 1 wherein identifying the structural shape of the unidentified object further comprises identifying the unidentified object as a three dimensional (3D) rectangular object based on the color gradient in the captured image.

6. The method of claim 1 wherein identifying the structural shape of the unidentified object further comprises identifying the unidentified object as a two dimensional (2D) object based on the color gradient in the captured image.

7. The method of claim 1 wherein identifying the structural shape of the object further comprises:
generating a three dimensional (3D) model of a product;
capturing a series of images of the 3D model at various rotational positions to thereby generate a 360° series of images of the 3D model; and
identifying the stored image by comparing the stored image with at least one of the series of images of the 3D model to determine a match therebetween.

8. The method of claim 7 wherein capturing the series of images of the 3D model at various rotational positions comprises capturing the series of images of the 3D model at one degree increment rotational positions to thereby generate 360 images of the 3D model at one degree rotational increments.

9. The method of claim 1 wherein identifying a color of the unidentified object further comprises:
determining an offset calculation to adjust color levels to reduce the effect of a high prevalence color in the specified regions of the unidentified object; and
applying the color offset to thereby adjust the high prevalence color that are not important in the specified regions of the unidentified object.

10. The method of claim 1 wherein identifying a color of the unidentified object further comprises:
designating a region of the unidentified object as a white color region;
retrieving color data values associated with the white color region under predetermined ambient lighting conditions;
storing the color data values associated with the white color region under the predetermined ambient lighting conditions;
retrieving color data values associated with the white color region of the captured image;
determining a difference between retrieved color data values for the white color region and the stored color data values associated with the white color region under the predetermined ambient lighting conditions; and
adjusting the color data for the captured image based on the difference between the retrieved color data values for the white color region and the stored color data values associated with the white color region under the predetermined ambient lighting conditions to thereby adjust a color balance to compensate for ambient lighting conditions that differ from the predetermined ambient lighting conditions.

11. A system for the control of augmented reality (AR) in a mobile communication device having a color display, the system comprising:
an imaging device configured to capture an image containing at least one object to be identified;
a data storage device configured to store computing instructions and to store the captured image;
one or more processors coupled to the data storage device to retrieve the computing instructions that, if executed, cause the one or more processors to:
detect the unidentified object to be identified within the stored image;
define edges of the unidentified object in the captured image;
evaluate any curvature of the edges of the unidentified object in the captured image;
evaluate a color gradient of the unidentified object in multiple dimensions;
use the evaluation of the defined edges and the evaluated color gradient to determine whether the unidentified object has a planar or non-planar structural shape;
designate specified regions of the unidentified object;
retrieve color data associated with the specified regions of the unidentified object;
perform a color matching analysis to determine the color of the specified regions of the unidentified object;
identify a color of the unidentified object;
based on the identified structural shape and identified color of the unidentified object, identify the unidentified object in the captured image;
transmit object identification data, containing structural shape information and color information for the identified object, to a server;
receive at the mobile communication device in response to the transmission of the object identification data to the server, a selected augmented reality (AR) video file selected by the server from a plurality of AR video files stored in the server based on the object identification data; and
play the received AR video file on the color display of the mobile communication device.

12. The system of claim 11 for use with a mobile communication device having an audio output device, further comprising:
the mobile communication device transmitting a language selection parameter based on user language selection for operation of the mobile communication device;
receive at the mobile communication device in response to the transmission of the language selection parameter to the server, a selected augmented reality (AR) audio file selected by the server from a plurality of AR audio files stored in the server based on the language selection parameter; and
play the received AR audio file on the audio output device of the mobile communication device in conjunction with the received AR video file being played on the color display of the mobile communication device.

13. The system of claim 11 wherein the computing instructions, if executed, further cause the one or more processors to identify a structural shape of the unidentified object by:
segmenting the captured image to create sections to thereby differentiate between objects within the captured image;
applying a grid to thereby identify curvatures and boundaries within the captured image; and
evaluating a light gradient to thereby identify any curvatures of objects in the captured image, wherein determining whether the unidentified object has a planar or non-planar structural shape uses the identified curvatures of objects in the captured image.

14. The system of claim 11 wherein the computing instructions, if executed, further cause the one or more processors to identify the structural shape of the unidentified object as a three dimensional (3D) cylindrical object based on the color gradient in the captured image.

15. The system of claim 11 wherein the computing instructions, if executed, further cause the one or more processors to identify the structural shape of the unidentified object as a three dimensional (3D) rectangular object based on the color gradient in the captured image.

16. The system of claim 11 wherein the computing instructions, if executed, further cause the one or more processors to identify the structural shape of the unidentified object as a two dimensional (2D) object based on the color gradient in the captured image.

17. The system of claim 11 wherein the computing instructions, if executed, further cause the one or more processors to identify a structural shape of the object by:
  generating a three dimensional (3D) model of a product;
  capturing a series of images of the 3D model at various rotational positions to thereby generate a 360° series of images of the 3D model; and
  identifying the stored image by comparing the stored image with at least one of the series of images of the 3D model to determine a match therebetween.

18. The system of claim 17 wherein the computing instructions, if executed, further cause the one or more processors to identify a structural shape of the object by capturing the series of images of the 3D model at one degree increment rotational positions to thereby generate 360 images of the 3D model at one degree rotational increments.

19. The system of claim 11 wherein the computing instructions, if executed, further cause the one or more processors to identify the color of the unidentified object by:
  determining an offset calculation to adjust color levels to reduce the effect of a high prevalence color in the specified regions of the unidentified object; and
  applying the color offset to thereby reduce the high prevalence color in the specified regions of the unidentified object.

20. The system of claim 11 wherein the computing instructions, if executed, further cause the one or more processors to identify the color of the unidentified object by:
  designating a region of the unidentified object as a white color region;
  retrieving color data values associated with the white color region under predetermined ambient lighting conditions;
  storing the color data values associated with the white color region under the predetermined ambient lighting conditions;
  retrieving color data values associated with the white color region of the captured image;
  determining a difference between retrieved color data values for the white color region and the stored color data values associated with the white color region under the predetermined ambient lighting conditions; and
  adjusting the color data for the captured image based on the difference between the retrieved color data values for the white color region and the stored color data values associated with the white color region under the predetermined ambient lighting conditions to thereby adjust a color balance to compensate for ambient lighting conditions that differ from the predetermined ambient lighting conditions.

21. A system for the control of augmented reality (AR) in a mobile communication device having a color display, the system comprising:
  an imaging device configured to capture an image containing at least one unidentified object;
  a data storage device configured to store computing instructions and to store the captured image;
  one or more processors coupled to the data storage device to retrieve the computing instructions that, if executed, cause the one or more processors to:
  detect the unidentified object to be identified within the stored image;
  define edges of the unidentified object in the captured image;
  evaluate any curvature of the edges of the unidentified object in the captured image;
  evaluate a color gradient of the unidentified object;
  use the evaluation of the defined edges and the evaluated color gradient to determine whether the unidentified object has a planar or non-planar structural shape;
  designate a region of the unidentified object as a white color region;
  retrieve color data values associated with the white color region under predetermined ambient lighting conditions;
  store the color data values associated with the white color region under the predetermined ambient lighting conditions;
  retrieve color data values associated with the designated white color region of the captured image;
  determine a difference between retrieved color data values for the designated white color region and the stored color data values associated with the white color region under the predetermined ambient lighting conditions;
  adjust the color data for the captured image based on the difference between the retrieved color data values for the designated white color region and the stored color data values associated with the white color region under the predetermined ambient lighting conditions to thereby adjust a color balance to compensate for ambient lighting conditions in the captured image that differ from the predetermined ambient lighting conditions;
  identify a color of the unidentified object;
  based on the identified structural shape and identified color of the unidentified object, identify the unidentified object in the captured image;
  transmit object identification data, containing structural shape information and color information for the identified object, to a server;
  receive at the mobile communication device in response to the transmission of the object identification data to the server, a selected augmented reality (AR) video file selected by the server from a plurality of AR video files stored in the server based on the object identification data; and
  play the received AR video file on the color display of the mobile communication device.

* * * * *